United States Patent
Sun et al.

(10) Patent No.: US 10,769,372 B2
(45) Date of Patent: Sep. 8, 2020

(54) SYNONYMY TAG OBTAINING METHOD AND APPARATUS, DEVICE AND COMPUTER READABLE STORAGE MEDIUM

(71) Applicant: BEIJING BAIDU NETCOM SCIENCE AND TECHNOLOGY CO., LTD., Haidian District Beijing (CN)

(72) Inventors: Ke Sun, Beijing (CN); Chaoyue Wang, Beijing (CN); Tingting Li, Beijing (CN); Shiqi Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 142 days.

(21) Appl. No.: 16/110,449

(22) Filed: Aug. 23, 2018

(65) Prior Publication Data
US 2019/0065474 A1    Feb. 28, 2019

(30) Foreign Application Priority Data
Aug. 23, 2017    (CN) .......................... 2017 1 0729010.2

(51) Int. Cl.
*G06F 16/00*     (2019.01)
*G06F 40/247*    (2020.01)
(Continued)

(52) U.S. Cl.
CPC .......... *G06F 40/247* (2020.01); *G06F 16/243* (2019.01); *G06F 16/2465* (2019.01);
(Continued)

(58) Field of Classification Search
CPC . G06F 16/243; G06F 16/2453; G06F 16/2454
See application file for complete search history.

(56) References Cited

U.S. PATENT DOCUMENTS 8,135,580 B1    3/2012   Jin et al.
2003/0066025 A1*   4/2003   Garner ................ G06F 16/3329
                                                              715/256
(Continued)

FOREIGN PATENT DOCUMENTS

CN    102722499 A    10/2012
CN    105956206 A     9/2016
(Continued)

OTHER PUBLICATIONS

Chinese Office Action dated Mar. 26, 2020, for related Chinese Appln. No. 2017107290102; 4 Pages.
(Continued)

*Primary Examiner* — Daniel Abebe
(74) *Attorney, Agent, or Firm* — Brooks Kushman PC (57) ABSTRACT

The present disclosure provides a synonym tag obtaining method and apparatus, a device, and a computer readable storage medium. By obtaining the central morpheme of the tag to be recognized and then obtaining the tag template of the tag to be recognized according to the tag to be recognized and the central morpheme of the tag to be recognized, to obtain the synonymy tag of the tag to be recognized according to the tag template, and the central morpheme of the tag to be recognized and at least one cluster of synonymy tag templates, it is possible to avoid the technical problem about reduction of the coverage rate of the synonymy tags caused by data sparsity of the mining resources and thereby improve the reliability of obtaining synonymy tags, without depending on mining resources such as a click log having a paraphrase relationship or data having bilingual parallel alignment corpus.

12 Claims, 2 Drawing Sheets

(51) Int. Cl.
    *G06F 16/242* (2019.01)
    *G06F 16/2458* (2019.01)
    *G06F 16/35* (2019.01)
    *G06F 40/279* (2020.01)
(52) U.S. Cl.
    CPC ............ *G06F 16/35* (2019.01); *G06F 40/279* (2020.01); *G06F 2216/03* (2013.01)

(56) References Cited

U.S. PATENT DOCUMENTS

| | | | | |
|---|---|---|---|---|
| 2007/0118512 | A1* | 5/2007 | Riley | G06F 16/3338 |
| 2007/0203929 | A1* | 8/2007 | Bolivar | G06F 16/2246 |
| 2008/0263019 | A1* | 10/2008 | Harrison | G06F 16/3334 |
| 2015/0149499 | A1* | 5/2015 | Mauge' | G06F 16/3338 |
| | | | | 707/766 |

FOREIGN PATENT DOCUMENTS

| | | |
|---|---|---|
| CN | 106934069 A | 7/2017 |
| WO | 2013136532 A1 | 9/2013 |

OTHER PUBLICATIONS

Chinese Search Report dated Mar. 20, 2020 for related Chinese Appln. No. 2017107290102; 3 Pages.

* cited by examiner

SYNONYMY TAG OBTAINING METHOD AND APPARATUS, DEVICE AND COMPUTER READABLE STORAGE MEDIUM

The present application claims the priority of Chinese Patent Application No. 201710729010.2, filed on Aug. 23, 2017, with the title of "Synonymy tag obtaining method and apparatus, device and computer readable storage medium". The disclosure of the above applications is incorporated herein by reference in its entirety.

FIELD OF THE DISCLOSURE

The present disclosure relates to search technologies, and particularly to a synonym tag obtaining method and apparatus, a device, and a computer readable storage medium.

BACKGROUND OF THE DISCLOSURE

A tag is a basis for a user to express a field demand, and is also a basis for forming the user's query. When the user uses a search engine to perform search, he uses a query to express a search intention. However, insufficient recall results are often caused because the user-selected query does not match search results. The problem is particularly serious in the vertical field. Take the field of movies as an example. When the user searches for "brain-burning movies", he really intends to search for "high IQ movies" or "suspense and reasoning-type movies". If the search engine does not build a mapping relationship between "brain-burning movies" with "high IQ", "suspense" and "reasoning"-type move resources, search results call will be caused insufficient.

Therefore, to enable search results in a synonymous relationship with the user-provided query to be recalled simultaneously, it is necessary to perform synonymous query expansion based on the user-provided query, i.e., while using the tag included by the query to search, it is also necessary to further use the synonymy tags of the tag to search, thereby achieving a purpose of meeting the user's real intention and enhancing the user's experience and maximized business value. At present, mining of synonym tags is handled as a phrase paraphrase task, which depends on mining resources such as a click log having a paraphrase relationship or data having bilingual parallel alignment corpus.

However, since the current mining of synonymy tags depends on mining resources such as a click log having a paraphrase relationship or data having bilingual parallel alignment corpus, is some cases, for example, the data of mining resources is sparse, a coverage rate of synonymy tags will be made lower and therefore a reliability of obtaining synonymy tags will be caused lower.

SUMMARY OF THE DISCLOSURE

A plurality of aspects of the present disclosure provide a synonym tag obtaining method and apparatus, a device, and a computer readable storage medium, to improve reliability of obtaining synonymy tags According to an aspect of the present disclosure, there is provided a synonymy tag obtaining method, comprising:
  obtaining a central morpheme of a tag to be recognized;
  obtaining a tag template of the tag to be recognized according to the tag to be recognized and the central morpheme thereof;
  obtaining a synonymy tag of the tag to be recognized according to the tag template, and the central morpheme thereof and at least one cluster of synonymy tag templates.

The above aspect and any possible implementation mode further provide an implementation mode: the obtaining a synonymy tag of the tag to be recognized according to the tag template, and the central morpheme thereof and at least one cluster of synonymy tag templates comprises:
  if the tag template is in any cluster of synonymy tag templates in said at least one cluster of synonymy tag templates, obtaining the synonymy tags of the tag to be recognized according to other synonymy tag templates except the tag template in said any one cluster of synonymy tag templates, and the central morpheme of the tag to be recognized.

The above aspect and any possible implementation mode further provide an implementation mode: before obtaining a synonymy tag of the tag to be recognized according to the tag template, and the central morpheme of the tag to be recognized and at least one cluster of synonymy tag templates, the method further comprises:
  obtaining at least two tags of a designated entity;
  performing filtration processing for said at least two tags according to similarity between any two tags of said at least two tags;
  obtaining a central morpheme of each tag in tags after the filtration processing;
  obtaining at least one cluster of synonymy tags according to the central morpheme of said each tag; the central morphemes of tags included in each of said at least one cluster of synonymy tags being the same; and
  obtaining said at least one cluster of synonymy tag templates according to said each cluster of synonymy tags and the central morphemes of tags therein.

The above aspect and any possible implementation mode further provide an implementation mode: the similarity between said any two tags includes at least one of character coincidence degree and word coincidence degree.

The above aspect and any possible implementation mode further provide an implementation mode: after obtaining a synonymy tag of the tag to be recognized according to the tag template, and the central morpheme of the tag to be recognized and at least one cluster of synonymy tag templates, the method further comprises:
  performing a search operation by using the tag to be recognized and the synonymy tags of the tag to be recognized.

According to another aspect of the present disclosure, there is provided a synonymy tag obtaining apparatus comprising:
  an obtaining unit configured to obtain a central morpheme of a tag to be recognized;
  a template unit configured to obtain a tag template of the tag to be recognized according to the tag to be recognized and the central morpheme thereof;
  a mining unit configured to obtain a synonymy tag of the tag to be recognized according to the tag template, and the central morpheme thereof and at least one cluster of synonymy tag templates.

The above aspect and any possible implementation mode further provide an implementation mode: the mining unit is specifically configured to
  if the tag template is in any cluster of synonymy tag templates in said at least one cluster of synonymy tag templates, obtain the synonymy tags of the tag to be recognized according to other synonymy tag templates except the tag template in said any one cluster of synonymy tag templates, and the central morpheme of the tag to be recognized.

The above aspect and any possible implementation mode further provide an implementation mode: the mining unit is further configured to obtain at least two tags of a designated entity;

perform filtration processing for said at least two tags according to similarity between any two tags of said at least two tags;

obtain a central morpheme of each tag in tags after the filtration processing;

obtain at least one cluster of synonymy tags according to the central morpheme of said each tag; the central morphemes of tags included in each of said at least one cluster of synonymy tags being the same; and obtain said at least one cluster of synonymy tag templates according to said each cluster of synonymy tags and the central morphemes of tags therein.

The above aspect and any possible implementation mode further provide an implementation mode: the similarity between said any two tags includes at least one of character coincidence degree and word coincidence degree.

The above aspect and any possible implementation mode further provide an implementation mode: the apparatus further comprises a search unit configured to perform a search operation by using the tag to be recognized and the synonymy tags of the tag to be recognized.

According to a further aspect of the present disclosure, there is provided a device, comprising one or more processors;

a storage for storing one or more programs, the one or more programs, when executed by said one or more processors, enable said one or more processors to implement the synonymy tag obtaining method according to the above first aspect.

According to another aspect of the present disclosure, there is provided a computer readable storage medium on which a computer program is stored, wherein the program, when executed by a processor, implements the synonymy tag obtaining method according to the above first aspect.

As known from the above technical solutions, in the present disclosure, by obtaining the central morpheme of the to-be-recognized and then obtaining the tag template of the tag to be recognized according to the tag to be recognized and the central morpheme of the tag to be recognized, so as to obtain the synonymy tag of the tag to be recognized according to the tag template, and the central morpheme of the tag to be recognized and at least one cluster of synonymy tag templates, it is possible to avoid the technical problem about reduction of the coverage rate of the synonymy tags caused by data sparsity of the mining resources in the prior art and thereby improve the reliability of obtaining synonymy tags, without depending on mining resources such as a click log having a paraphrase relationship or data having bilingual parallel alignment corpus.

In addition, the technical solutions according to the present disclosure can be used to effectively improve the user's experience.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "I" in the text generally indicates associated objects before and after the symbol are in an "or" relationship.

Figure 1:
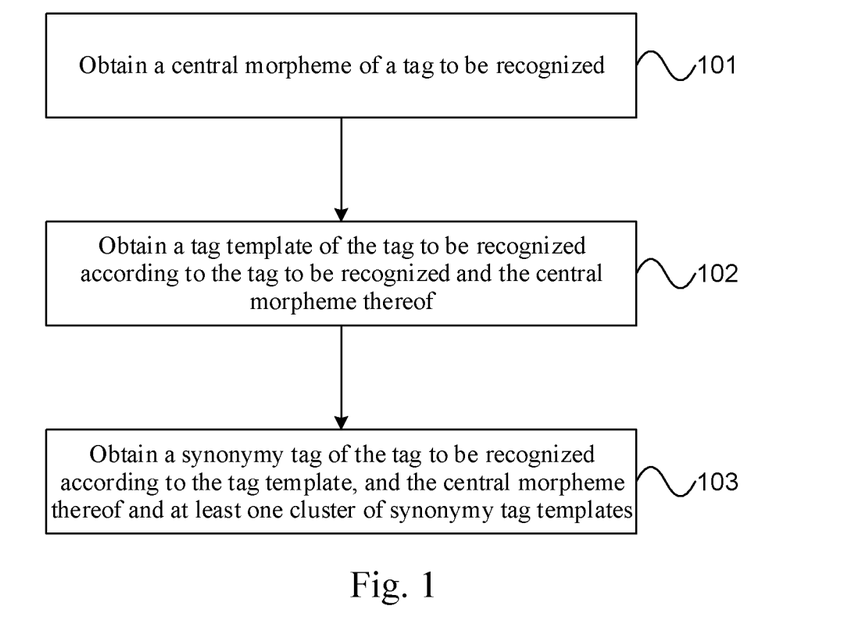
FIG. 1 is a flow chart of a synonymy tag obtaining method according to an embodiment of the present disclosure.

FIG. 1 is a flow chart of a synonymy tag obtaining method according to an embodiment of the present disclosure. As shown in FIG. 1, the method comprises:

101: obtaining a central morpheme of a tag to be recognized.

102: obtaining a tag template of the tag to be recognized according to the tag to be recognized and the central morpheme of the tag to be recognized.

103: obtaining a synonymy tag of the tag to be recognized according to the tag template, and the central morpheme of the tag to be recognized and at least one cluster of synonymy tag templates.

It needs to be appreciated that subjects for executing 101-103 may partially or totally be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

As such, by obtaining a central morpheme of a tag to be recognized and then obtaining a tag template of the tag to be recognized according to the tag to be recognized and the central morpheme of the tag to be recognized, so as to obtain a synonymy tag of the tag to be recognized according to the tag template, and the central morpheme of the tag to be recognized and at least one cluster of synonymy tag templates, it is possible to avoid the technical problem about reduction of the coverage rate of the synonymy tags caused by data sparsity of the mining resources in the prior art and thereby improve the reliability of obtaining synonymy tags, without depending on mining resources such as a click log having a paraphrase relationship or data having bilingual parallel alignment corpus.

Optionally, in a possible implementation mode of the present embodiment, in 101, it is specifically feasible to use wordrank algorithm to perform important term recognition for the tag to be recognized to obtain the central morpheme of the tag to be recognized.

Optionally, in a possible implementation mode of the present embodiment, in 102, it is specifically feasible to regard content of the tag to be recognized after the central morpheme of the tag to be recognized is deleted, as the tag template of the tag to be recognized. For example, if the tag to be recognized is about humanity and its central morpheme is humanity, its tag template is about <slot>.

Optionally, in a possible implementation mode of the present embodiment, before 103, the method may further comprise a step of pre-obtaining said at least one cluster of synonymy tag templates.

First, it is feasible to obtain at two tags of a designated entity, and perform filtration processing for said at least two tags according to similarity between any two tags of said at least two tags. The similarity between any two tags may include but is not limited to at least one of character coincidence degree and word coincidence degree. This is not particularly limited in the present embodiment.

For example, all tags mapped to entity E form a cluster of synonymy tags. Any tag in the cluster of synonymy tags is represented as tag $t_i$, wherein 2≤i≤K, and K is the number of tags mapped to the entity E. Other tags tag $(t_1-t_{i-1}, t_{i+1}-t_K)$ in the cluster of synonymy tags all serve as synonymy tags of tag $t_i$. Any two of $t_i$ and candidate tag $(t_1-t_{i-1}, t_{i+1}-t_K)$ form a synonymy tag pair. Then it is feasible to obtain at least one of character coincidence degree and word coincidence degree between two tags of the formed synonymy tag pair, and then according to at least one of the character coincidence degree and word coincidence degree, filter away at least one pair in the following synonymy tag pairs by using a preset character coincidence degree threshold and word coincidence degree threshold corresponding thereto:

synonymy tag pairs smaller than the character coincidence degree threshold;

synonymy tag pairs smaller than the word coincidence degree threshold; and synonymy tag pairs smaller than the character coincidence degree threshold and smaller than the word coincidence degree threshold.

wherein, specifically, the character coincidence degree between two tags may be obtained using the following equation:

$$s1(tag1, tag2) = \frac{com1(tag1, tag2)}{\max(len1(tag1), len1(tag2))}$$

where s1(tag1, tag2) is the character coincidence degree between tag1 and tag2 in the synonymy tag pair, com1(tag1, tag2) is the number of identical characters between tag1 and tag2 in the synonymy tag pair, len1(tag1) is the number of characters included in tag1, and len1(tag2) is the number of characters included in tag2.

Specifically, the word coincidence degree between two tags may be obtained using the following equation:

$$s2(tag1, tag2) = \frac{com2(tag1, tag2)}{\max(len2(tag1), len2(tag2))}$$

where s2(tag1, tag2) is the word coincidence degree between tag1 and tag2 in the synonymy tag pair, com2 (tag1, tag2) is the number of identical words between tag1 and tag2 in the synonymy tag pair, len2(tag1) is the number of words included in tag1, and len2 (tag2) is the number of words included in tag2.

Secondly, it is feasible to obtain a central morpheme of each tag in tags after the filtration processing, and then obtain at least one cluster of synonymy tags according to the central morpheme of said each tag; the central morphemes of tags included in each cluster of synonymy tags in said at least one cluster of synonymy tags are the same.

For example, it is feasible to use wordrank algorithm to perform important term recognition for each tag to obtain the central morpheme of the tag. Tags with the same central morpheme form a final cluster of synonymy tags.

Then, it is feasible to obtain said at least one cluster of synonymy tag templates according to said each cluster of synonymy tags and the central morphemes of tags included in said cluster of synonymy tags.

For example, it is feasible to obtain a tag template of each tag according to each tag included in each cluster of synonymy tags and the central morphemes of tags included in said cluster of synonymy tags. The tag templates of these tags form a cluster of synonymy tag templates of the cluster of synonymy tags. That is to say, tag templates of tags which are in a synonymy relationship are in a synonymy relationship.

Optionally, in a possible implementation mode of the present embodiment, in 103, specifically if the tag template is in any cluster of synonymy tag templates in said at least one cluster of synonymy tag templates, the synonymy tags of the tag to be recognized may be obtained according to other synonymy tag templates except the tag template in said any one cluster of synonymy tag templates, and the central morpheme of the tag to be recognized.

The so-called entity may be understood as an instantiation of an abstract concept, and is comprised of name, type, and attribute information describing the entity.

Specifically, it is possible to judge whether the tag template is in any cluster of synonymy tag templates in said at least one cluster of synonymy tag templates.

If the tag template is in any cluster of synonymy tag templates in said at least one cluster of synonymy tag templates, the synonymy tags of the tag to be recognized may be obtained according to other synonymy tag templates except the tag template in said any one cluster of synonymy tag templates, and the central morpheme of the tag to be recognized.

If the tag template is not in any cluster of synonymy tag templates in said at least one cluster of synonymy tag templates, it is feasible to perform the abovementioned step of pre-obtaining said at least one cluster of synonymy tag templates by regarding the entity to which the tag corresponding to the tag template belongs, as a designated entity.

Optionally, in a possible implementation mode of the present embodiment, after 103, it is further feasible to perform a search operation by using the tag to be recognized and the synonymy tags of the tag to be recognized.

The present disclosure may be adapted to, in the vertical field, perform mining of synonymy tags, and search for the user's synonymy expression behaviors by using the mapping relationship between the tag and the entity, thereby obtaining synonymy tags meeting the user's query intention and conforming to search engine characteristics, and achieving the purpose of increasing the number of recalled search results.

In the present embodiment, by obtaining the central morpheme of the tag to be recognized and then obtaining the tag template of the tag to be recognized according to the tag to be recognized and the central morpheme of the tag to be recognized, so as to obtain the synonymy tag of the tag to be recognized according to the tag template, and the central morpheme of the tag to be recognized and at least one cluster of synonymy tag templates, it is possible to avoid the technical problem about reduction of the coverage rate of the synonymy tags caused by data sparsity of the mining resources in the prior art and thereby improve the reliability of obtaining synonymy tags, without depending on mining resources such as a click log having a paraphrase relationship or data having bilingual parallel alignment corpus.

In addition, the technical solution according to the present disclosure can be used to effectively improve the user's experience.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
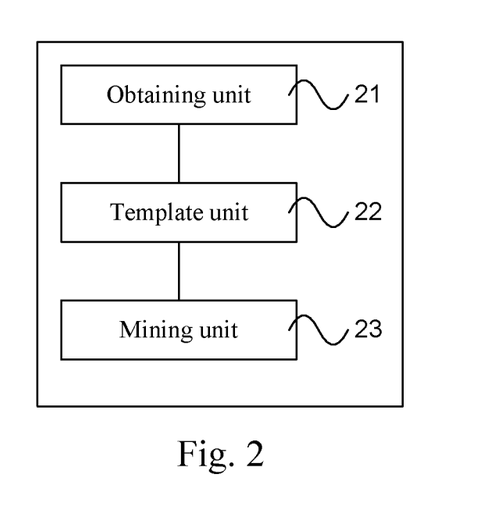
FIG. 2 is a structural schematic diagram of a synonymy tag obtaining apparatus according to another embodiment of the present disclosure.

FIG. 2 is a structural schematic diagram of a synonymy tag obtaining apparatus according to another embodiment of the present disclosure. As shown in FIG. 2, the synonymy tag obtaining apparatus according to the present embodiment may comprise an obtaining unit 21, a template unit 22 and a mining unit 23. The obtaining unit 21 is configured to obtain a central morpheme of a tag to be recognized; the template unit 22 is configured to obtain a tag template of the tag to be recognized according to the tag to be recognized and the central morpheme of the tag to be recognized; the mining unit 23 is configured to obtain a synonymy tag of the tag to be recognized according to the tag template, and the central morpheme of the tag to be recognized and at least one cluster of synonymy tag templates.

It needs to be appreciated that the synonymy tag obtaining apparatus according to the present embodiment may partially or totally be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

Figure 3:
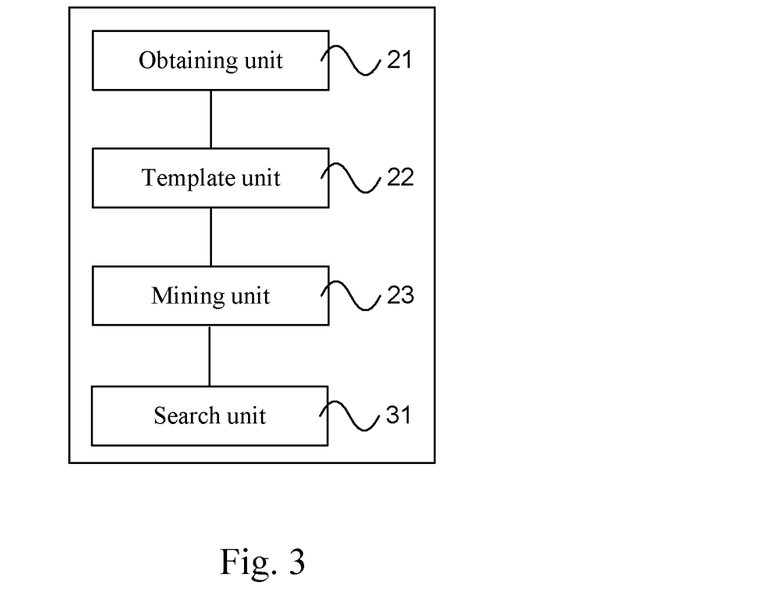
FIG. 3 is a structural schematic diagram of a synonymy tag obtaining apparatus according to another embodiment of the present disclosure.

Optionally, in a possible implementation mode of the present embodiment, as shown in FIG. 3, the synonymy tag obtaining apparatus according to the present embodiment may further include a search unit 31 configured to perform a search operation by using the tag to be recognized and the synonymy tags of the tag to be recognized.

Optionally, in a possible implementation mode of the present embodiment, the mining unit 23 may be specifically configured to, if the tag template is in any cluster of synonymy tag templates in said at least one cluster of synonymy tag templates, obtain the synonymy tags of the tag to be recognized according to other synonymy tag templates except the tag template in said any one cluster of synonymy tag templates, and the central morpheme of the tag to be recognized.

Optionally, in a possible implementation mode of the present embodiment, the mining unit 23 may be further configured to obtain at least two tags of a designated entity; perform filtration processing for said at least two tags according to similarity between any two tags of said at least two tags; obtain a central morpheme of each tag in tags after the filtration processing; obtain at least one cluster of synonymy tags according to the central morpheme of said each tag; the central morphemes of tags included in each cluster of synonymy tags in said at least one cluster of synonymy tags are the same; and obtain said at least one cluster of synonymy tag templates according to said each cluster of synonymy tags and the central morphemes of tags included in said cluster of synonymy tags.

The similarity between any two tags may include but is not limited to at least one of character coincidence degree and word coincidence degree. This is not particularly limited in the present embodiment.

It needs to be appreciated that the method in the embodiment corresponding to FIG. 1 may be implemented by the synonymy tag obtaining apparatus according to the present embodiment. Reference may be made to relevant content in the embodiment corresponding to FIG. 1 for detailed description, which will not be detailed any longer here.

In the present embodiment, the obtaining unit obtains the central morpheme of the tag to be recognized, and then the template unit obtains the tag template of the tag to be recognized according to the tag to be recognized and the central morpheme of the tag to be recognized, so that the mining unit obtains the synonymy tag of the tag to be recognized according to the tag template, and the central morpheme of the tag to be recognized and at least one cluster of synonymy tag templates. It is possible to avoid the technical problem about reduction of the coverage rate of the synonymy tags caused by data sparsity of the mining resources in the prior art and thereby improve the reliability of obtaining synonymy tags, without depending on mining resources such as a click log having a paraphrase relationship or data having bilingual parallel alignment corpus.

In addition, the technical solution according to the present disclosure can be used to effectively improve the user's experience.

Figure 4:
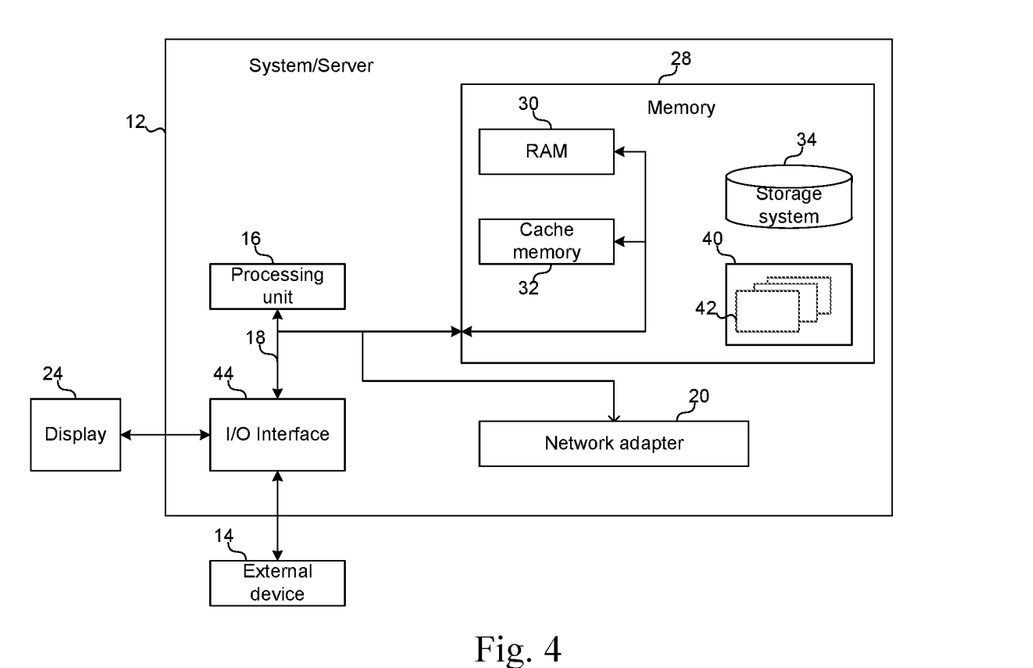
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the system memory 28, for example, implement the synonymy tag obtaining method provided by the embodiment corresponding to FIG. 1.

The present disclosure meanwhile provides a computer-readable storage medium on which a computer program is stored, the program, when executed by a processor, implementing the synonymy tag obtaining method provided by the embodiment corresponding to FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art may clearly understand for the sake of convenience and brevity of description, reference may be mad to the corresponding process in the abovementioned method embodiment for a specific working process of the system, apparatus and unit described above. No detailed description is presented here any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not cause essence of corresponding technical solutions to depart from the spirit and scope of technical solutions of embodiments of the present disclosure.

What is claimed is:

1. A synonymy tag obtaining method, wherein the method comprises:
    obtaining a central morpheme of a tag to be recognized;
    obtaining a tag template of the tag to be recognized according to the tag to be recognized and the central morpheme thereof; and
    obtaining a synonymy tag of the tag to be recognized according to the tag template, and the central morpheme thereof and at least one cluster of synonymy tag templates, comprising:
        if the tag template is in any cluster of synonymy tag templates in said at least one cluster of synonymy tag templates, obtaining the synonymy tags of the tag to be recognized according to other synonymy tag templates except the tag template in said any one cluster of synonymy tag templates and the central morpheme of the tag to be recognized.

2. The method according to claim 1, wherein before obtaining a synonymy tag of the tag to be recognized according to the tag template, and the central morpheme of the tag to be recognized and at least one cluster of synonymy tag templates, the method further comprises:
    obtaining at least two tags of a designated entity;
    performing filtration processing for said at least two tags according to similarity between any two tags of said at least two tags;
    obtaining a central morpheme of each tag in tags after the filtration processing;
    obtaining at least one cluster of synonymy tags according to the central morpheme of said each tag; the central morphemes of tags included in each of said at least one cluster of synonymy tags being the same; and
    obtaining said at least one cluster of synonymy tag templates according to said each cluster of synonymy tags and the central morphemes of tags therein.

3. The method according to claim 2, wherein the similarity between said any two tags includes at least one of character coincidence degree and word coincidence degree.

4. The method according to claim 1, wherein after obtaining a synonymy tag of the tag to be recognized according to the tag template, and the central morpheme of the tag to be recognized and at least one cluster of synonymy tag templates, the method further comprises:
    performing a search operation by using the tag to be recognized and the synonymy tags of the tag to be recognized.

5. A device, wherein the device comprises:
    one or more processors;
    a storage for storing one or more programs,
    the one or more programs, when executed by said one or more processors, enable said one or more processors to implement a synonymy tag obtaining method, wherein the method comprises:
    obtaining a central morpheme of a tagto be recognized;
    obtaining a tag template of the tag to be recognized according to the tag to be recognized and the central morpheme thereof; and
    obtaining a synonymy tag of the tag to be recognized according to the tag template, and the central morpheme thereof and at least one cluster of synonymy tag templates, comprising:
        if the tag template is in any duster of synonymy tag templates in said at least one cluster of synonymy tag templates, obtaining the synonymy tags of the tag to be recognized according to other synonymy tag templates except the tag template in said any one cluster of synonymy tag templates and the central morphene of the tag to be recognized.

6. The device according to claim 5, wherein before obtaining a synonymy tag of the tag to be recognized according to the tag template, and the central morpheme of the tag to be recognized and at least one cluster of synonymy tag templates, the method further comprises:

obtaining at least two tags of a designated entity;

performing filtration processing for said at least two tags according to similarity between any two tags of said at least two tags;

obtaining a central morpheme of each tag in tags after the filtration processing;

obtaining at least one cluster of synonymy tags according to the central morpheme of said each tag; the central morphemes of tags included in each of said at least one cluster of synonymy tags being the same; and obtaining said at least onecluster of synonymy tag templates according to said each cluster of synonymy tags and the central morphemes of tags therein.

7. The device according to claim 6, wherein the similarity between said any two tags includes at least one of character coincidence degree and word coincidence degree.

8. The device according to claim 5, wherein after obtaining a synonymy tag of the tag to be recognized according to the tag template, and the central morpheme of the tag to be recognized and at least one cluster of synonymy tag templates, the method further comprises:

performing a search operation by using the tag to be recognized and the synonymy tags of the tag to be recognized.

9. A non-transitory computer readable storage medium on which a computer program is stored, wherein the program, when executed by a processor, implements a synonymy tag obtaining method, wherein the method comprises:

obtaining a central morpheme of a tag to be recognized;

obtaining a tag template of the tag to be recognized according to the tag to be recognized and the central morpheme thereof; and obtaining a synonymy tag of the tag to be recognized according to the tag template, and the central morpheme thereof and at least one cluster of synonymy tag templates, comprising:

if the tag template is in any cluster of synonymy tag templates in said at least one cluster of synonymy tag templates, obtaining the synonymy tags of the tag to be recognized according to other synonymy tag templates except the tag template in said any one cluster of synonymy tag templates and the central morpheme of the tag to be recognized.

10. The non-transitory computer readable storage medium according to claim 9, wherein before obtaining a synonymy tag of the tag to be recognized according to the tag template, and the central morpheme of the tag to be recognized and at least one cluster of synonymy tag templates, the method further comprises:

obtaining at least two tags of a designated entity;

performing filtration processing for said at least two tags according to similarity between any two tags of said at least two tags;

obtaining a central morpheme of each tag in tags after the filtration processing;

obtaining at least one cluster of synonymy tags according to the central morpheme of said each tag; the central morphemes of tags included in each of said at least one cluster of synonymy tags being the same; and obtaining said at least one cluster of synonymy tag templates according to said each cluster of synonymy tags and the central morphemes of tags therein.

11. The non-transitory computer readable storage medium according to claim 10, wherein the similarity between said any two tags includes at least one of character coincidence degree and word coincidence degree.

12. The non-transitory computer readable storage medium according to claim 9, wherein after obtaining a synonymy tag of the tag to be recognized according to the tag template, and the central morpheme of the tag to be recognized and at least one cluster of synonymy tag templates, the method further comprises:

performing a search operation by using the tag to be recognized and the synonymy tags of the tag to be recognized.

\* \* \* \* \*

UNITED STATES PATENT AND TRADEMARK OFFICE
CERTIFICATE OF CORRECTION

Page 1 of 1

PATENT NO. : 10,769,372 B2
APPLICATION NO. : 16/110449
DATED : September 8, 2020
INVENTOR(S) : Ke Sun et al.

It is certified that error appears in the above-identified patent and that said Letters Patent is hereby corrected as shown below:

In the Claims

Column 12, Line 56, Claim 5:
After "if the tag template is in any"
Delete "duster" and
Insert -- cluster --.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*